United States Patent
Lee et al.

(10) Patent No.: US 11,002,599 B2
(45) Date of Patent: May 11, 2021

(54) APPARATUS AND METHOD FOR VERIFYING REPEATABILITY OF SPECTROSCOPE, AND APPARATUS FOR ANALYZING SPECTRUM DATA

(71) Applicant: SAMSUNG ELECTRONICS CO., LTD., Suwon-si (KR)

(72) Inventors: So Young Lee, Suwon-si (KR); Sang Kyu Kim, Yongin-si (KR); Kun Sun Eom, Seoul (KR); Joon Hyung Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/919,876

(22) Filed: Jul. 2, 2020

(65) Prior Publication Data
US 2020/0333183 A1    Oct. 22, 2020

Related U.S. Application Data

(62) Division of application No. 15/215,050, filed on Jul. 20, 2016, now Pat. No. 10,746,597.

(30) Foreign Application Priority Data

Jul. 30, 2015    (KR) .................. 10-2015-0108288

(51) Int. Cl.
*G06F 17/18* (2006.01)
*G01J 3/02* (2006.01)
*G01J 3/28* (2006.01)

(52) U.S. Cl.
CPC ............. *G01J 3/027* (2013.01); *G01J 3/0264* (2013.01); *G01J 3/0272* (2013.01); *G01J 3/28* (2013.01)

(58) Field of Classification Search
CPC ....................................................... G01J 3/027
See application file for complete search history.

(56) References Cited

U.S. PATENT DOCUMENTS

| | | | |
|---|---|---|---|
| 7,763,404 B2 | 7/2010 | Willis et al. | |
| 9,322,771 B2 | 4/2016 | Son et al. | |
| 10,182,757 B2 | 1/2019 | Gareau et al. | |
| 2008/0076045 A1 | 3/2008 | Willis et al. | |
| 2012/0250002 A1* | 10/2012 | Cronin | H01L 27/14601 356/71 |
| 2013/0038860 A1 | 2/2013 | Matsui et al. | |
| 2013/0122529 A1 | 5/2013 | Akerstrom et al. | |
| 2014/0213909 A1* | 7/2014 | Mestha | A61B 5/1075 600/476 |

(Continued)

FOREIGN PATENT DOCUMENTS

| | | |
|---|---|---|
| JP | 2002-343300 A | 11/2002 |
| JP | 2004-321325 A | 11/2004 |

(Continued)

*Primary Examiner* — Aditya S Bhat
(74) *Attorney, Agent, or Firm* — Sughrue Mion, PLLC

(57) ABSTRACT

A method of verifying repeatability of a spectroscope that irradiates light to a user sample, detects light reflected from the user sample, and measures spectrum data of the user sample, includes: verifying repeatability of the spectrum data, measured by the spectroscope, based on repeatability verification criteria; and controlling the spectroscope whether or not to remeasure the spectrum data, based on the verifying.

10 Claims, 10 Drawing Sheets

(56) References Cited

U.S. PATENT DOCUMENTS

2015/0044098 A1\* 2/2015 Smart .................... G01J 3/2823
   422/82.05
2017/0064142 A1\* 3/2017 Tsukada ............. H04N 1/00251

FOREIGN PATENT DOCUMENTS

| JP | 2012-212887 A | 11/2012 |
| KR | 10-2014-0110632 A | 9/2014 |

\* cited by examiner

APPARATUS AND METHOD FOR VERIFYING REPEATABILITY OF SPECTROSCOPE, AND APPARATUS FOR ANALYZING SPECTRUM DATA

CROSS-REFERENCE TO RELATED APPLICATIONS

This is a Divisional of U.S. application Ser. No. 15/215,050 filed Jul. 20, 2016, which claims priority from Korean Patent Application No. 10-2015-0108288, filed Jul. 30, 2015, in the Korean Intellectual Property Office. The disclosure of above-named applications are incorporated by reference herein in their entireties.

BACKGROUND

1. Field

The following description relates to an apparatus and method for verifying repeatability of a spectroscope, and an apparatus for analyzing spectrum data, which applies the apparatus and method.

2. Description of the Related Art

A spectroscope is an instrument used to examine properties of light for a specific portion of the electromagnetic spectrum and typically used in spectroscopic analysis to identify materials. A measurement variable is generally the light's intensity, but could also be the polarization.

Due to the recent development of mobile devices, such as smartphones, tablet PCs, etc., health-care devices with a spectroscope combined with a mobile device are being developed. These health-care devices are minimized to be attached to or operate in association with smartphones or tablet PCs. In addition, these health-care devices can diagnose and manage a personal health condition and analyze all types of diseases quantitatively.

Meanwhile, due to the minimization of mobile devices, the size of the spectroscope being installed becomes smaller, and this may lead to difficulties in a precise diagnosis and analysis due to a spectroscope's performance degradation and an increase in noise that is caused by external environmental factor.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, an apparatus for verifying repeatability of a spectroscope that irradiates light to a user sample, detects light reflected from the user sample, and measures spectrum data of the user sample includes: a verifier to verify repeatability of spectrum data, measured by the spectroscope, based on predefined repeatability verification criteria; and a controller to control the spectroscope whether to remeasure the spectrum data based on the verification result.

The predefined repeatability verification criteria may include a similarity verification, a difference verification, a statistical verification, and a combination of two or more thereof.

In response to the similarity verification among the predefined repeatability verification criteria, the verifier may calculate a degree of similarity between a plurality of spectrum data, measured by the spectroscope, by using at least one of Pearson correlation, Kendall correlation, and Spearman correlation.

In response to the difference verification among the predefined repeatability verification criteria, the verifier may calculate a degree of difference between a plurality of spectrum data, measured by the spectroscope, by using at least one of Euclidean distance, Manhattan distance, and Hamming distance, and verify the repeatability thereof based on the calculated degree of difference.

In response to the statistical verification among the predefined repeatability verification criteria, the verifier may calculate statistical data of a plurality of spectrum data, measured by the spectroscope, by using statistical techniques that include at least one of a paired T-test and a paired Z-test, and verify the repeatability thereof based on the calculated statistical data.

The verifier may verify repeatability of currently measured spectrum data based on the predefined repeatability verification criteria by using at least one of values of mean and median of the spectrum data that is previously measured by the spectroscope.

The controller may in response to the spectrum data having failed to pass the repeatability verification, control the spectroscope to remeasure the spectrum data; and in response to the spectrum data having passed the repeatability verification, control an apparatus for analyzing spectrum data to analyze the measured spectrum data.

The controller may control the spectroscope by determining a number of remeasurement times, or control the apparatus for analyzing spectrum data by determining spectrum data to be analyzed, based on at least one of a number of spectrum data having passed the repeatability verification, a rate thereof, and a number of times that each spectrum data has failed to pass the repeatability verification.

According to an aspect of an exemplary embodiment, an apparatus for analyzing spectrum data includes: a spectroscopy unit, which includes a light source that irradiates light to a user sample, a detector that detects light reflected from the user sample, and a spectrum acquirer that acquires spectrum data from the detected light; a verifier to verify repeatability of the acquired spectrum data based on predefined repeatability verification criteria; and a calculator to generate user sample analysis information by analyzing at least a part of the acquired spectrum data based on the verification result.

The predefined repeatability verification criteria may include a similarity verification, a difference verification, a statistical verification, and a combination of two or more thereof.

The verifier may, based on the verification result, control the spectroscopy unit to remeasure the spectrum data, or control the calculator to analyze at least a part of a plurality of spectrum data acquired by the spectroscopy unit.

The verifier may control the calculator by determining spectrum data to be analyzed, based on at least one of a number of spectrum data having passed the repeatability verification, a rate thereof, and a number of times that each spectrum data has failed to pass the repeatability verification.

The verifier may calculate at least one of values of mean, median, max, and min of the spectrum data that is determined to be analyzed, and provide the calculation result to the calculator.

The apparatus may further include an information provider configured to provide the generated user sample analysis information to a user.

According to an aspect of an exemplary embodiment, a method of verifying repeatability of a spectroscope that irradiates light to a user sample, detects light reflected from the user sample, and measures spectrum data of the user sample includes: verifying repeatability of spectrum data, measured by the spectroscope, based on predefined repeatability verification criteria; and controlling, based on the verification result, the spectroscope whether to remeasure the spectrum data.

The predefined repeatability verification criteria may include a similarity verification, a difference verification, a statistical verification, and a combination of two or more thereof.

The verifying of the repeatability of spectrum data may include verifying repeatability of currently measured spectrum data based on the predefined repeatability verification criteria by using at least one of values of mean and median of the spectrum data that is previously measured by the spectroscope.

The controlling of the spectroscope may include: in response to the spectrum data having failed to pass the repeatability verification, controlling the spectroscope to remeasure the spectrum data; and in response to the spectrum data having passed the repeatability verification, controlling an apparatus for analyzing spectrum data to analyze the measured spectrum data.

The controlling of the spectroscope may include controlling the spectroscope by determining a number of remeasurement times, or controlling the apparatus for analyzing spectrum data by determining spectrum data to be analyzed, based on at least one of a number of spectrum data having passed the repeatability verification, a rate thereof, and a number of times that each spectrum data has failed to pass the repeatability verification.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
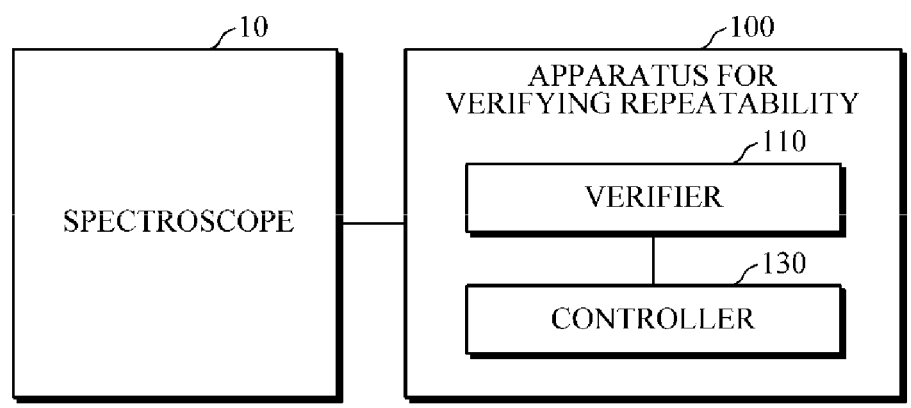
FIG. 1 is a diagram illustrating an apparatus for verifying repeatability according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a diagram illustrating a verification apparatus 100 for verifying repeatability according to an exemplary embodiment.

Referring to FIG. 1, the verification apparatus 100 includes a verifier 110, e.g., a processor or a microprocessor, and a controller 130, e.g., a processor or a microprocessor.

The verification apparatus 100 may verify the repeatability of a spectroscope 10 that irradiates light to a user sample, detects the light reflected from the user sample, and measures spectrum data of the user sample.

In the case where the spectroscope 10 measures only one spectrum data, the spectroscope 10 fails to check measurement errors being generated in the measured spectrum, or noises being added thereto. However, when a plurality of spectrum data is measured, the plurality of the measured spectrum data is compared to each other, thereby checking the spectrum data including the generated measurement errors or the added noises.

The verifier 110 may verify the repeatability of the spectrum data, measured by the spectroscope 10, based on predefined repeatability verification criteria.

The predefined repeatability verification criteria may include at least one among a similarity verification, a difference verification, a statistical verification, or a combination of two or more of the verification criteria.

The predefined repeatability verification criteria may be, for example, the similarity verification. It may be assumed that the verifier 110 receives the input of three spectrum data from the spectroscope 10. The verifier 110 may calculate degrees of similarity between the three spectrum data. Here, the degree of similarity may be calculated by forming the three spectrum data in group of two in pair, which results in three degrees of similarity (3C2=3). Afterwards, in the case where the resultant three degrees of similarity are higher than a certain criterion, the verifier 110 may determine that the three spectrum data have passed the repeatability verification. Alternatively, in the case where the part of the three degrees of similarity is less than or equal to a certain criterion, the verifier 110 determines that the three spectrum data has failed to pass the repeatability verification.

In another example, the predefined repeatability verification criteria may be the difference verification. As in the description above regarding the similarity verification, it is assumed that the verifier 110 receive the input of three spectrum data from the spectroscope 10. Under that assumption, in the case where the resultant three degrees of difference are less than or equal to a certain criterion, the verifier 110 may determine that the three spectrum data have passed the repeatability verification. Alternatively, in the case where the part of the three degrees of difference is higher than a certain criterion, the verifier 110 determines that three spectrum data have failed to pass the repeatability verification.

In yet another example, the predefined repeatability verification criteria may be the statistical verification. In this case as well as in the description above, depending on whether the resultant three statistical data are higher than a certain criterion, the verifier 110 may determine that the three spectrum data have passed the repeatability verification, or that the three spectrum data have failed to pass the repeatability verification,.

In still yet another example, the verifier 110 may verify the repeatability of spectrum data based on predefined repeatability verification criteria, which include a similarity verification, a difference verification, a statistical verification, or the combination of two or more of the verification criteria, on a basis of currently measured spectrum data and the value, which is generated based on a plurality of spectrum data that is previously measured from the spectroscope 110.

The verifier 110 may, based on at least one of a specific duration and a specific number of times, generate at least one of the values of mean, median, maximum (max), and minimum (min) by using the spectrum data that has been received before the present measurement point in time. For example, the verifier 110 may generate at least one of the values of mean and median by using spectrum data that has been measured within ten minutes from a present point in time or using spectrum data that has been measured since the ten times before the present point in time.

In addition, the verifier 110 may verify the repeatability of the spectrum data by comparing the generated value and the currently measured spectrum data. To perform this verification, the verifier 110 may calculate degrees of similarity between the generated values and the currently measured spectrum data, a degree of difference therebetween, or a statistical data thereof. If the calculated value is higher than a certain criterion, it may be determined that the spectrum data has passed the repeatability verification.

The number of spectrum data being described is just an example, and is not limiting.

In yet another example, the predefined repeatability verification criteria may be the combination of a similarity verification and a difference verification. For example, spectrum data may have the repeatability verification results according to the similarity verification and the difference verification. In this case, only if all the two types of verification results have been passed, the verifier 110 may pass the repeatability verification. Alternatively, the verifier 110 may pass the repeatability verification even in the case where any one of the two verification results is passed. Alternatively, the verifier 110 put a weight value on any one of the two types of verification results, and based on the addition result thereof, the verifier 530 may pass the repeatability verification only when the condition of the repeatability verification is satisfied.

The controller 130 may, based on the verification result, control whether the spectroscope 10 will remeasure the spectrum data.

In response to the repeatability verification determination, by the verifier, indicating that the spectrum data has passed the repeatability verification, the controller 130 may control an apparatus for analyzing spectrum data (hereinafter, referred to as 'analysis apparatus') to analyze the relevant spectrum data. Meanwhile, in the case where the spectrum data passes the repeatability verification, the controller 130 may control the spectroscope to remeasure spectrum data.

Moreover, in response to the repeatability verification determination indicating that the spectrum data has passed the repeatability verification, the controller 130 may control the analysis apparatus to analyze at least one of a plurality of the measured spectrum data based on at least one among the following: the number of spectrum data having passed the repeatability verification, a rate thereof, and the number of times that each spectrum data has failed to pass the repeatability verification. However, for example, if the spectrum data has passed the repeatability verification but one of the spectrum data seems much different from the other spectrum data, the controller 130 may analyze only the other spectrum data, excluding the corresponding spectrum data.

Furthermore, based on at least one of the number of spectrum data having passed the repeatability verification, a rate thereof, and the number of times that each spectrum data has failed to pass the repeatability verification, the controller 130 may determine the number of remeasurement times, and control the spectroscope to remeasure spectrum data depending on the determined number of remeasurement times. For example, if the spectrum data has passed the repeatability verification but one of the spectrum data seems much different from the other spectrum data, the controller 130 may control the spectroscope to measure the spectrum data the same number of times as the previously measured one. Meanwhile, if two or more of the spectrum data seem much different from the other spectrum data, the controller 130 may control the spectroscope to measure the spectrum data the greater number of times than the previously measured one.

Figure 2A:
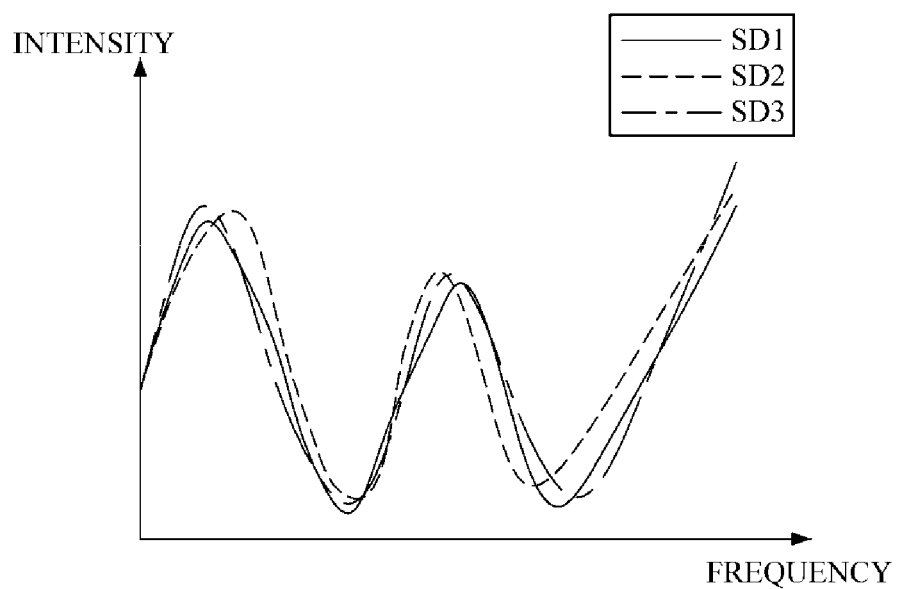
FIGS. 2A and 2B are examples for the description of spectrum data according to an exemplary embodiment.
Figure 2B:
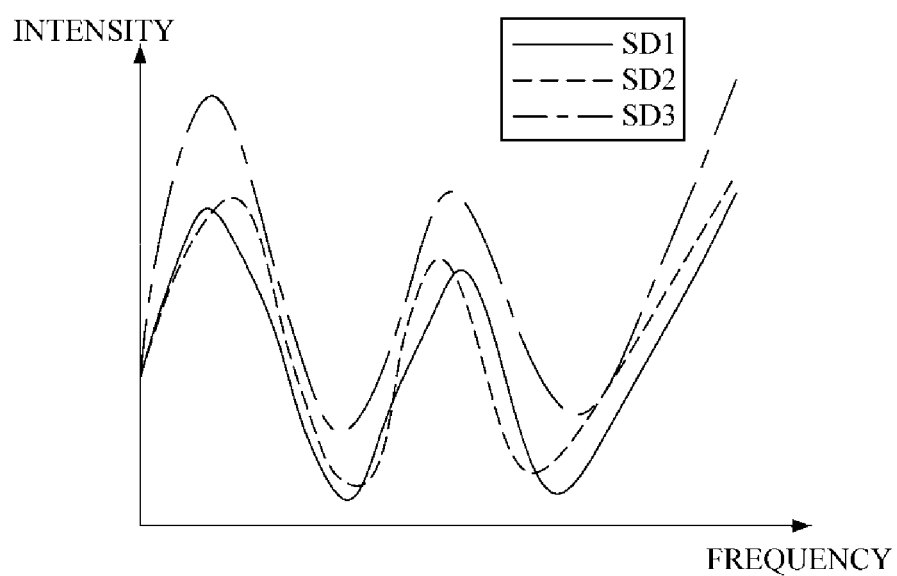

FIGS. 2A and 2B are examples for the description of spectrum data according to an exemplary embodiment.

If a spectroscope repeatedly measures the spectrum data of the same user sample, each of the spectrum data may be measured to be different due to the following factors: a performance of the spectroscope itself, a state of the user sample at a time when the spectrum data thereof is measured, external noises, etc.

Referring to FIGS. 1 and 2A, in the case where the spectroscope measures spectrum data SD1, SD2, and SD3 at three times, the three spectrum data SD1, SD2, and SD3 may be measured to be similar to each other. In this case, a verifier 110 may determine that the three spectrum data meet repeatability verification criteria, and the controller 130 may determine to analyze the three measured spectrum data.

Referring to FIGS. 1 and 2B, in the case where the spectroscope measures spectrum data SD1, SD2, and SD3 of the same user sample at three times, two of the three spectrum data SD1, SD2, and SD3, i.e., SD1 and SD2, may be measured to be similar, and one spectrum data, i.e., SD3, may be different. In this case, the verifier 110 may determine that the spectrum data does not meet repeatability verification criteria.

Figure 3:
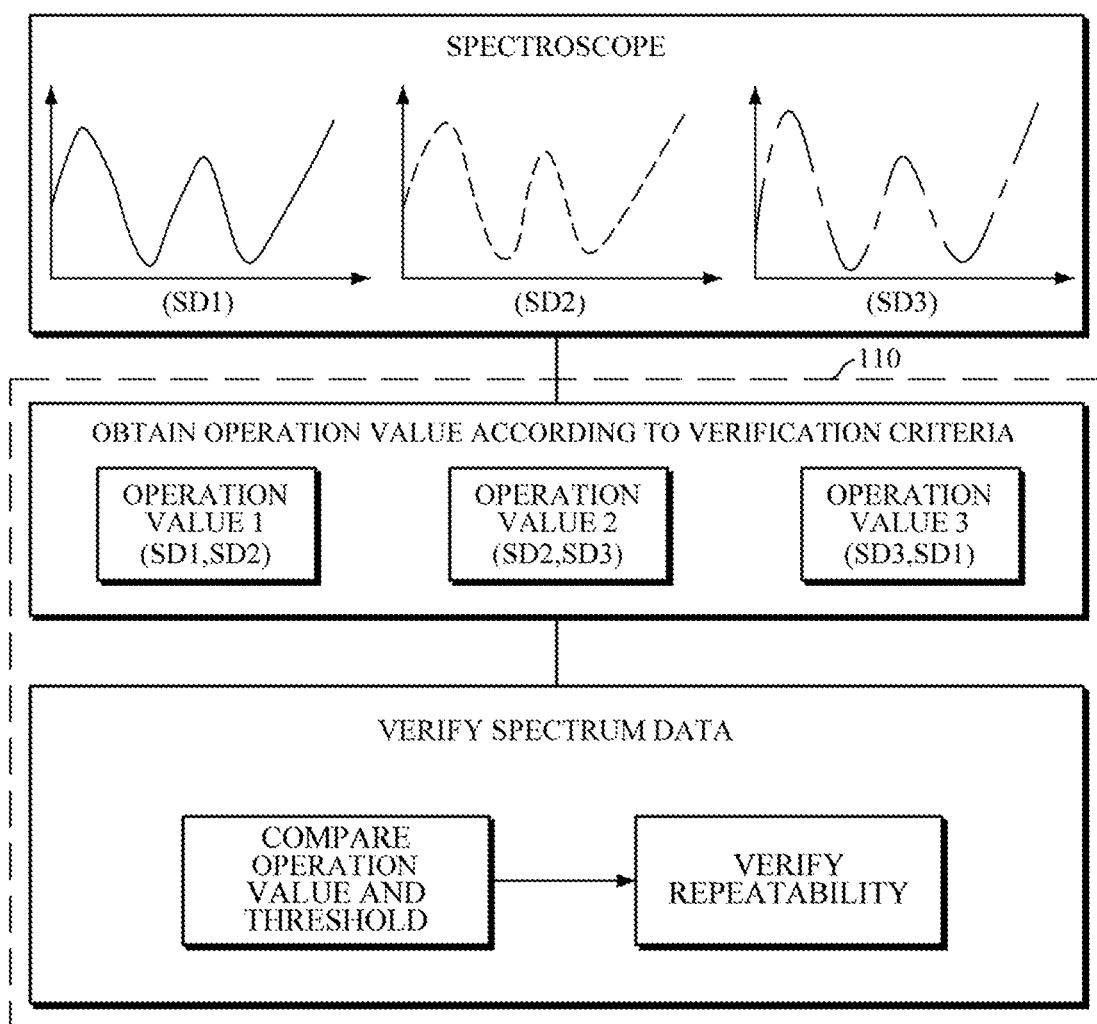
FIG. 3 is a diagram illustrating a method of verifying the repeatability of spectrum data by a verifier according to an exemplary embodiment.

FIG. 3 is a diagram illustrating a method of verifying the repeatability of spectrum data by a verifier 110 according to an exemplary embodiment.

Referring to FIG. 3, the verifier 110 may receive spectrum data from a spectroscope. For example, in the case where a spectroscope measures three spectrum data SD1, SD2, and SD3 from the same user sample, the verifier 110 may verify the repeatability of the spectrum data, measured by the spectroscope, based on predefined repeatability verification criteria.

Here, the predefined repeatability verification criteria may include a similarity verification, a difference verification, statistical verification, or a combination of two or more of the verification criteria The verifier 110 may obtain an operation value that is required according to the repeatability verification criteria.

If the verifier 110 uses, for example, the similarity verification as the predefined repeatability verification criteria, the verifier 110 may calculate degrees of similarity between a plurality of spectrum data that is measured by the spectroscope, and verify the repeatability based on the calculated degrees of similarity. That is, the operation value may be the degree of similarity Here, a method of calculating the degree of similarity may be at least one of Pearson correlation, Kendall correlation, and Spearman correlation.

For example, in the case where the degree of similarity is calculated using Pearson correlation, the verifier 110 may calculate the degree of similarity as shown in Equation 1 below $$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{[Equation 1]}$$

Here, 'r' indicates a degree of similarity; '$x_i$' and '$y_i$', two spectrum data for the comparison of the degrees of similarity; and $\bar{x}$ and $\bar{y}$, an average value of the spectrum data.

That is, an operation value A is a degree of similarity between the two spectrum data SD1 and SD2; an operation value B, a degree of similarity between the two spectrum data SD2 and SD3; and an operation value C, a degree of similarity between the two spectrum data SD3 and SD1.

Comparing each of the degrees of similarity calculated above to a threshold, the verifier 110 may verify the repeatability of the spectrum data, measured by the spectroscope, based on the number of the degrees of similarity greater than or equal to the threshold.

A threshold may be, for example, 0.8; and the standard number of degrees of similarity greater than or equal to the threshold may be greater than or equal to '3'. For example, in the case where the operation values 1, 2, and 3 are, respectively, '0.9', '0.85', and '0.95', it means that they are all greater than or equal to the threshold and meet the standard number of the degrees of similarity greater than or equal to the threshold, which thus indicates that they meet repeatability verification criteria. In this case, the verifier 110 may determine that the three spectrum data SD1, SD2, and SD3 have passed the repeatability verification.

In yet another example, in the case where the operation values 1, 2, and 3 are, respectively, '0.9', '0.6', and '0.5', the operation values 2 and 3 are smaller than the threshold, and the operation value A is greater than the threshold. Here, the number of the operation values greater than the threshold is one, which means that this case does not satisfy the standard number of the degrees of similarity that are greater than or equal to the threshold. In this case, the verifier 110 may determine that the three spectrum data SD1, SD2, and SD3 have not passed the repeatability verification.

However, in the case where it is assumed that the standard number of the degrees of similarity greater than or equal to the threshold is greater than or equal to '1', the verifier 110 may determine that the three spectrum data SD1, SD2, and SD3 have passed the repeatability verification. Here, the verifier 110 may detect the causative spectrum data that makes the operation values 2 and 3 smaller than the threshold. For example, the verifier 110 may detect SD3, which is included in common when the operation values 2 and 3 are each calculated, as a causative spectrum data that makes the operation values 2 and 3 smaller than the threshold. In this case, the verifier 110 may determine that the spectrum data SD1 and SD2 have passed the repeatability verification, excluding SD3.

In another example, if the verifier 110 uses the difference verification as the predefined repeatability verification criteria, the verifier 110 may calculate a degree of difference between a plurality of spectrum data, which is measured from the spectroscope, and verify the repeatability based on the calculated degree of difference. That is, an operation value may be a degree of difference. Here, a method of calculating the degree of difference may be at least one of Euclidean distance, Manhattan distance, and Hamming distance.

For example, in the case where the degree of difference is calculated using Euclidean distance, the verifier 110 may calculate the degree of difference as shown in Equation 2 below.

$$d = \sqrt{\sum_{i=1}^{n}(x_i - y_i)^2} \quad \text{[Equation 2]}$$

Here, 'd' indicates a degree of difference; and '$x_i$' and '$y_i$', two spectrum data for the comparison of the degree of difference Comparing each of the degrees of difference calculated above to a threshold, the verifier 110 may verify the repeatability of the spectrum data, measured by the spectroscope, based on the number of the degrees of difference less than or equal to the threshold A threshold may be, for example, 0.2; and the standard number of degrees of difference less than or equal to the threshold may be greater than or equal to '3' For example, in the case where the operation values 1, 2, and 3 are, respectively, '0.1', '0.15', and '0.2', it means that they are all less than or equal to the threshold and meet the standard number of the degrees of difference less than or equal to the threshold, which thus indicates that they meet repeatability verification criteria, In this case, the verifier 110 may determine that the three spectrum data SD1, SD2, and SD3 have passed the repeatability verification.

In yet another example, in the case where the operation values 1, 2, and 3 are, respectively, '0.1', '0.25', and '0.3', the operation values 2 and 3 are greater than or equal to the threshold, and the operation value A is less than or equal to the threshold. Here, the number of the operation values less than the threshold is one, which means this case does not satisfy the standard number of the degrees of difference less than the threshold In this case, the verifier 110 may determine that the three spectrum data SD1, SD2, and SD3 have not passed the repeatability verification.

However, in the case where it is assumed that the standard number of the degrees of difference less than or equal to the threshold is greater than or equal to '1', the verifier 110 may determine that the three spectrum data SD1, SD2, and SD3 have passed the repeatability verification. Here, the verifier 110 may detect the causative spectrum data that makes the operation values 2 and 3 greater than or equal to the threshold. For example, the verifier 110 may detect SD3, which is included, in common when the operation values 2 and 3 are each calculated, as a causative spectrum data that makes the operation values 2 and 3 greater than or equal to the threshold. In this case, the verifier 110 may determine that the spectrum data SD1 and SD2 have passed the repeatability verification, excluding SD3.

In yet another example, if the verifier 110 uses the statistical verification as the predefined repeatability verification criteria, the verifier 110 may calculate statistical data between a plurality of spectrum data, which is measured from the spectroscope, and verify the based on the calculated statistical data. That is, an operation value may be a statistical data Here, a method of calculating the statistical data may be a statistical technique including at least one of a paired T-test and a paired Z-test.

For example, in the case where the statistical data is calculated using a paired T-test, the verifier 110 may calculate the statistical data as shown in Equation 3 below $$t = \frac{\overline{X_D}}{S_D / \sqrt{n}} \qquad \text{[Equation 3]}$$

Here, 't' indicates statistical data; '$X_D$', a set of differences of two spectrum data ($X_D = \{(x_1-y_1), (x_2-y_2), \ldots, (x_n-y_n)\}$); $\overline{X_D}$, an average of $X_D$; and $S_D$, a variance thereof.

As in the description above regarding the similarity or difference verification, in the case where the statistical verification is used, the verifier 110 may compare each of the statistical data, calculated above, to a threshold, thereby based on the number of the degrees of similarity less than or equal to the threshold, verifying the repeatability of the spectrum data measured by the spectroscope.

In still yet another example, if the verifier 110 uses the combination of two or more of the similarity verification, the difference verification, and the statistical verification, the verifier 110 may calculate degrees of similarity between a plurality of spectrum data measured by the spectroscope, degrees of difference therebetween, and statistical data thereof, and verify the repeatability based on the calculated degrees of similarity, degrees of difference, and statistical data. For example, in the case where the spectrum data SD1, SD2, and SD3 have the following results of the similarity verification, difference verification, and statistical data verification, the verifier 110 may verify the repeatability through a combination of each result.

TABLE 1

|  | Verification Result |
| --- | --- |
| Similarity Verification | Passed |
| Difference Verification | Not passed |
| Statistical Verification | Passed |

Under the determination that only when all the similarity verification, the difference verification, and the statistical verification have been passed, the spectrum data has passed the repeatability verification, the verifier 110 may determine that the spectrum data above have failed to pass the repeatability verification.

In another example, under the determination that only when two or more of the similarity, difference, and statistical verification have been passed, the repeatability verification is passed, the verifier 110 may determine that the spectrum data has passed the repeatability verification.

In yet another example, the verifier 110 may determine whether the repeatability verification is passed in the repeatability verification criteria by putting a weight on the results of the similarity, difference, and statistical verification. For example, the passage of the similarity verification leads to the determination of a weight of '0.5'; the passage of the difference verification, a weight of '0.3'; and the passage of the statistical verification, a weight of '0.2'. In the case where each of the weights is added together thus being greater than or equal to '0.7', it may be determined that the repeatability verification is passed. In this case, the verifier 110 may add the weights, resulting in '0.7', which means that the repeatability verification has been passed.

The operation value, threshold, and weight being used in the exemplary embodiments above are examples for those skilled in the art precisely understanding and easily implementing the features of the present application, to which the scope of claims thereof is not limited. Moreover, the exemplary embodiments above may be combined and modified within the scope of claims that are easily derived by those skilled in the art.

Figure 4:
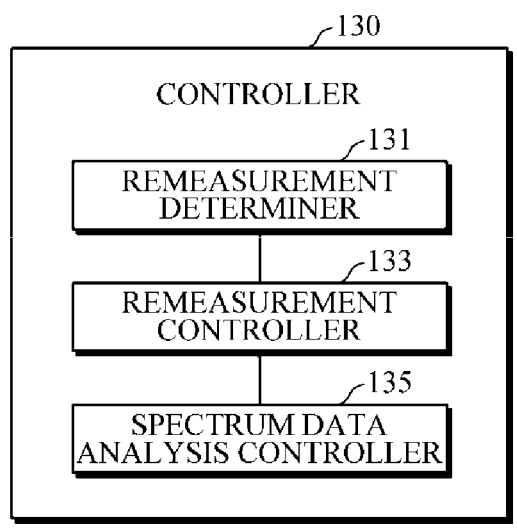
FIG. 4 is a diagram illustrating a controller according to an exemplary embodiment.

FIG. 4 is a diagram illustrating a controller according to an exemplary embodiment.

Referring to FIG. 4, the controller 130 includes a remeasurement determiner 131, a remeasurement controller 133, and a spectrum data analysis controller 135.

If spectrum data fails to pass a repeatability verification, the controller 130 may control a spectroscope to remeasure spectrum data. Meanwhile, if the spectrum data has passed the repeatability verification, the controller 130 may control an apparatus for analyzing the spectrum data (hereinafter, referred to as 'analysis apparatus') to analyze the measured spectrum data.

According to the verification result of the verifier 110, the remeasurement determiner 131 may determine whether to remeasure spectrum data or to analyze the measured spectrum data, based on at least one of the following: the number of spectrum data having passed the repeatability verification, a rate thereof, and the number of times that each spectrum data has failed to pass the repeatability verification.

The remeasurement determiner 131 may, for example, determine whether to remeasure spectrum data based on the number of spectrum data having passed the repeatability verification. The verifier 110 verifies the repeatability of the spectrum data based on the similarity verification, thereby resulting in an assumption that there are in total three spectrum data being repeatedly measured. Here, in the case where two or more spectrum data have passed the repeatability verification, the remeasurement determiner 131 may determine to analyze the spectrum data. Meanwhile, in the case of the spectrum data less than two having passed the repeatability verification, the determiner 131 may determine to remeasure the spectrum data.

In another example, the remeasurement determiner 131 may determine whether to remeasure spectrum data based on a rate of the spectrum data having passed the repeatability verification. For example, if the verifier 110 verifies the repeatability of the spectrum data based on the similarity verification. Then, in the case where 70% or more of the repeatedly measured spectrum data has passed the repeatability verification, the remeasurement determiner 131 may determine to analyze the spectrum data. Meanwhile, in the case where 70% or less of the repeatedly measured spectrum data has passed the repeatability verification, the remeasurement determiner 131 may determine to remeasure the spectrum data.

In yet another example, the remeasurement determiner 131 may determine whether to remeasure the spectrum data based on the number of times that each spectrum data has failed to pass the repeatability verification. The verifier 110 may, for example, verify repeatability of the spectrum data based on similarity, difference, and statistical verifications. In the case where among the repeatedly measured spectrum data, there are two or more spectrum data, of which the number of times that the spectrum data has failed to pass the repeatability verification is less than twice, the remeasurement determiner 131 may determine to analyze the spectrum data. Meanwhile, in the case where the number of the spectrum data thereof is less than two, the remeasurement determiner 131 may determine to remeasure the spectrum data.

The number of spectrum data, a rate thereof, and the number of times being described is just an example, and is not limiting.

Based on at least one of the number of spectrum data having passed the repeatability verification, a rate thereof, and the number of times that each spectrum data has failed to pass the repeatability verification, the remeasurement controller 133 may determine the number of remeasurement times, and then control the spectroscope to remeasure spectrum data depending on the determined number of remeasurement times.

For example, the remeasurement controller 133 may determine the number of remeasurement times based on the number of the spectrum data having passed the repeatability verification. The remeasurement controller 133 may, for example, determine to remeasure the spectrum data by increasing the number of remeasurement times so that the number of the spectrum data having passed the repeatability verification is inversely proportional to the total number of spectrum data. For example, in the case where among a total of five spectrum data, there are four number of the spectrum data having passed the repeatability verification, the number of remeasurement times may be determined to be five times. Meanwhile, in the case where there are three spectrum data having passed the repeatability verification among a total of five spectrum data, the remeasurement controller 133 may determine the number of remeasurement times to be seven times.

In another example, the remeasurement controller 133 may determine the number of remeasurement times based on a rate of the spectrum having passed the repeatability verification. The remeasurement controller 133 may, for example, determine to remeasure the spectrum data by increasing the number of remeasurement times in inverse proportion to the rate of the spectrum data having passed the repeatability verification. For example, in the case where the rate of the spectrum data having passed the repeatability verification is greater than or equal to 70%, the remeasurement controller 133 may determine the number of measurement times to be five times. Meanwhile, in the case where the rate thereof less than 70%, the remeasurement controller 133 may determine the number of remeasurement times to be seven times.

In yet another example, the remeasurement controller 133 may determine the number of remeasurement times based on the number of times that each spectrum data has failed to pass the repeatability verification. For example, the remeasurement controller 133 may verify repeatability of spectrum data based on similarity, difference, and statistical verifications. In the case where among a total of five spectrum data being repeatedly measured, there are four spectrum data, of which the number of times that the spectrum data has failed to pass the repeatability verification is less than twice, the remeasurement controller 133 may determine the number of remeasurement times to be five times. Meanwhile, in the case where there are three spectrum data among the total of five spectrum data, the remeasurement controller 133 may determine the number of remeasurement times to be seven times.

In still yet another example, the remeasurement controller 133 may determine the number of remeasurement times based on a combination of the following: the number of spectrum data having passed the repeatability verification, a rate thereof, and the number of times that each spectrum data has failed to pass the verification.

The number of spectrum data, a rate thereof, and the number of times being described is just an example, and is not limiting.

The remeasurement controller 133 may determine the number of remeasurement times based on at least one of the number of spectrum data having passed the repeatability verification, a rate thereof, and the number of times that each spectrum data has failed to pass the repeatability verification, and then control the spectroscope by transmitting a control signal including the number of remeasurement times to the spectroscope so as to remeasure spectrum data depending on the determined number of remeasurement times.

The spectrum data analysis controller 135 may control the analysis apparatus to analyze at least one of a plurality of measured spectrum data, based on at least one of the following: the number of spectrum data having passed the repeatability verification, a rate thereof, and the number of times that each spectrum data has failed to pass the repeatability verification.

For example, the spectrum data analysis controller 135 may control the analysis apparatus to analyze at least one of the plurality of the measured spectrum data based on the number of the spectrum data having passed the repeatability verification. For example, in the case where the number of the spectrum data having passed the repeatability verification is two, the spectrum data analysis controller 135 may control the analysis apparatus to analyze only the two spectrum data. Alternatively, in the case where the number of the spectrum data having passed the repeatability verification is two, the spectrum data analysis controller 135 may control the analysis apparatus to analyze one of the two spectrum data according to a predetermined rule. Alternatively, in the case where the number of the spectrum data having passed the repeatability verification is two, the spectrum data analysis controller 135 may control the analysis apparatus to analyze all the spectrum data that has failed to pass the verification, as well as the two spectrum data having passed the verification.

In another example, the spectrum data analysis controller 135 may control the analysis apparatus to analyze at least one of the plurality of the measured spectrum data based on the rate of the spectrum data having passed the repeatability verification. For example, in the case where the rate of the spectrum data having passed the repeatability verification is greater than or equal to 70%, the spectrum data analysis controller 135 may control the analysis apparatus to analyze the entire of the spectrum data. Alternatively, in the case where the rate of the spectrum data having passed the repeatability verification is greater than or equal to 70%, the spectrum data analysis controller 135 may control the analysis apparatus to analyze only the spectrum data having passed the verification. Alternatively, in the case where the rate of the spectrum data having passed the repeatability verification is greater than or equal to 70%, the spectrum data analysis controller 135 may control the analysis apparatus to analyze only one of the spectrum data having passed the verification, according to a predetermined rule.

In yet another example, the spectrum data analysis controller 135 may control the analysis apparatus to analyze at least one of the plurality of the measured spectrum data based on the number of times that each spectrum data has failed to pass the verification. For example, the spectrum data analysis controller 135 may control the analysis apparatus to analyze only the spectrum data, of which the number of times that each spectrum data has failed to pass the verification is zero. In another example, the spectrum data analysis controller 135 may control the analysis apparatus to analyze only the spectrum data, of which the number of times that each spectrum data has failed to pass the verification is less than or equal to one.

The number of spectrum data, a rate thereof, and the number of times being described is just an example, and is not limiting.

In response to a request for analyzing two or more spectrum data, the spectrum data analysis controller 135 may request the analysis apparatus to analyze each spectrum data. Alternatively, in response to a request for analyzing two or more spectrum data, the spectrum data analysis controller 135 may request the analysis apparatus to analyze the spectrum data that is generated using at least one of the values of mean, median, max, and min of each spectrum data.

Figure 5:
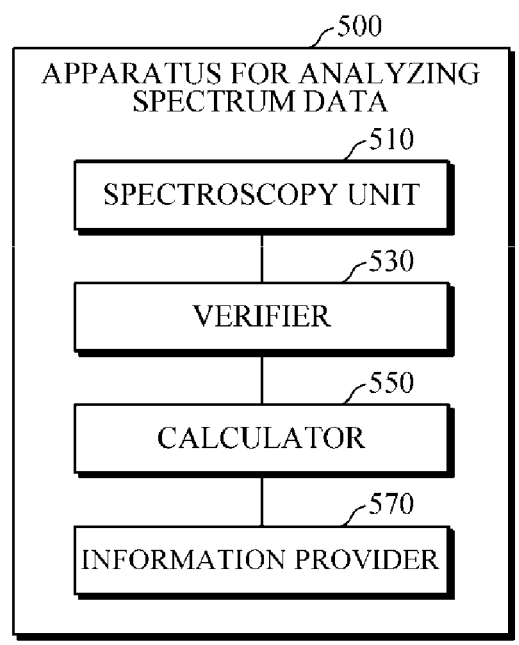
FIG. 5 is a diagram illustrating an apparatus for analyzing spectrum data according to an exemplary embodiment.

FIG. 5 is a diagram illustrating an analysis apparatus 500, including a processor or a microprocessor, for analyzing spectrum data according to an exemplary embodiment. The analysis apparatus 500 may refer to a healthcare device, such as smartphones, tablet PCs, laptops, smartwatches, smartbands, and smartglasses, which are capable of measuring physiological parameters including a user's blood pressure, body fat percentage, blood sugar, and triglyceride percentage.

Referring to FIG. 5, the analysis apparatus 500 includes a spectroscopy unit 510, a verifier 530, a calculator 550, and an information provider 570, e.g., an output unit or an output transmitter.

The examples of the spectroscopy unit 510 and the verifier 530 in FIG. 5 may be, respectively, a spectroscope 10 and a verification apparatus 100 for verifying repeatability, which are both illustrated in FIG. 1.

Figure 6:
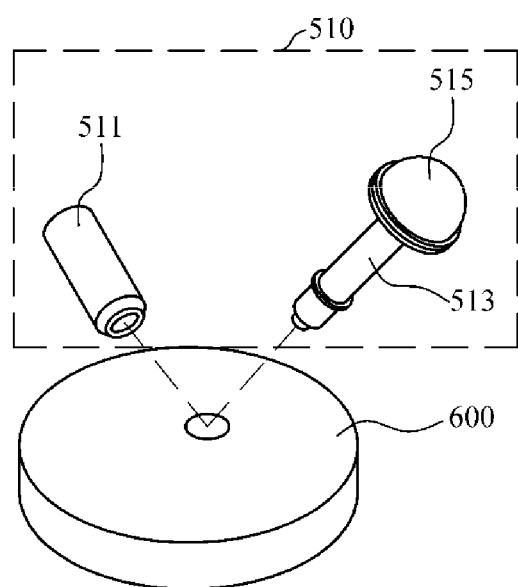
FIG. 6 is a diagram illustrating a spectroscopy unit according to an exemplary embodiment.

FIG. 6 is a diagram illustrating a spectroscopy unit 510 according to an exemplary embodiment.

Referring to FIGS. 5 and 6, the spectroscopy unit 510 includes a light source 511 that irradiates light to a user sample, a detector 513, e.g., a sensor or sensors, that detect the light reflected from the user sample 600, and a spectrum acquirer 515, e.g., a sensor and/or a processor, to acquire spectrum data from the detected light.

The analysis apparatus 500 may refer to a smartband. The smartband may be worn on a user's wrist, and the user's wrist may refer to the user sample 600. The smartband may include the spectroscopy unit 510, which is located in the part thereof that is in contact with the user's wrist. In this case, the light source 511 may irradiate light to the user's wrist, and then the detector 513 may detect the reflected light from the skin on the user's wrist.

A spectroscope may be classified according to a spectroscopy. For example, the spectroscopy being used by the spectroscope may refer to at least one of the following spectroscopies: nuclear magnetic resonance (NMR), infrared spectroscopy (IR), Raman spectroscopy, X-ray fluorescence (XRF), gamma spectroscopy, ultraviolet-visible spectroscopy (UV-Vis), near-infrared spectroscopy (NIR), Auger electron Spectroscopy (AES), X-ray photoelectron spectroscopy (XPS), atomic absorption spectroscopy (AAS), and inductively coupled plasma-atomic emission spectroscopy (ICP-AES).

The light source 511 may generate a light of a particular wavelength according to a spectroscopy being used. For example, in the case where the spectroscope uses the NIR, the light source may generate a near-infrared signal. The light generated through such an operation may be irradiated to the user sample, and a part of the irradiated light is reflected therefrom and then detected by the detector 513. The detector may convert the detected light to an electrical signal.

Thus, the light source 511 and the detector 513 may be located in the same plane of the analysis apparatus 500, and located close to each other so as to improve the detection performance of the reflected light.

The spectrum acquirer 515 may generate each spectrum data regarding the detected light. The spectrum acquirer 515 is electrically connected to the detector 513 so as to receive the electrical signal regarding the detected light from the detector 513. The spectrum acquirer 515 may generate the spectrum data by analyzing an intensity of the detected light according to a frequency thereof based on the received electrical signal The spectrum acquirer 515 may repeatedly receive an electrical signal regarding the same user sample 600 from the detector 513. For example, the spectrum acquirer 515 may receive the electrical signals three times regarding the same user sample 600. In this case, the spectrum acquirer 515 may generate three spectrum data regarding each detected light from the detector 513.

The verifier 530 may verify the repeatability of the spectrum data, acquired by the spectroscopy unit, based on predefined repeatability verification criteria. To perform the verification, the verifier 530 may be electrically connected to the spectrum acquirer 515.

The verifier 530 may receive the spectrum data from the spectrum acquirer 515. The predefined repeatability verification criteria may include a similarity verification, a difference verification, a statistical verification, or a combination of two or more of the verification criteria.

The predefined repeatability verification criteria may be, for example, the similarity verification. In the case where the verifier 530 receives the input of three spectrum data from the spectroscope, the verifier 530 may calculate degrees of similarity between the three spectrum data. Here, in the case where the resultant similarities between the three spectrum data are greater than or equal to a certain criterion, it may be determined that all the three spectrum data have passed the repeatability verification. Meanwhile, in the case where similarities of a part of the three spectrum data are less than a certain criterion, the verifier 530 may determine that the corresponding spectrum data has not passed the repeatability verification. The number of spectrum data being described is just an example, and is not limiting.

In another example, the predefined repeatability verification criteria may be the combination of a similarity verification and a difference verification. For example, in the case where the verifier 530 receives the input of the three spectrum data from the spectroscope, the verifier 530 may calculate the similarities between the three spectrum data and the differences therebetween. Here, the spectrum data may have the repeatability verification results according to the similarity verification and the difference verification. In this case, for example, only if all the two types of verification results have been passed, the verifier 530 may pass the repeatability verification. In another example, the verifier 530 may pass the repeatability verification even in the case where any one of the two verification results is passed. In yet another example, the verifier 530 may put a weight value on any one of the two types of verification results, and based on the addition result thereof, the verifier 530 may pass the repeatability verification only when the condition of the repeatability verification is satisfied.

The verifier 530 may, based on the verification result, control whether the spectroscope will remeasure the spectrum data.

The verifier 530 may determine whether to analyze spectrum data, or to remeasure the spectrum data, based on at least one of the following: the number of spectrum data having passed the repeatability verification, a rate thereof, and the number of times that each spectrum data has failed to pass the repeatability verification.

In one example, the verifier 530 may determine whether to remeasure the spectrum data based on the number of the spectrum data having passed the repeatability verification. For example, in the case where the repeatability of three spectrum data is verified, and all the three spectrum data have passed the repeatability verification, the verifier 530 may determine whether to analyze the spectrum data, or otherwise, may determine to remeasure the spectrum data.

The verifier 530 may determine whether to remeasure the spectrum data based on the number of spectrum data having passed the repeatability verification. The verifier 530 may verify the repeatability of the spectrum data based on, for example, a similarity verification. In the case where among a total of three spectrum data being repeatedly measured, the two or more spectrum data have passed the repeatability verification, the verifier 530 may determine to analyze the spectrum data. Meanwhile, in the case where the number of the spectrum data having passed the repeatability verification is less than two, the verifier 530 may determine to remeasure the spectrum data.

In another example, the verifier 530 may determine whether to remeasure spectrum data based on a rate of the spectrum data having passed the repeatability verification. For example, if the verifier 530 verifies the repeatability of the spectrum data based on the similarity verification. Then, in the case where 70% or more of the repeatedly measured spectrum data has passed the repeatability verification, the verifier 530 may determine to analyze the spectrum data. Meanwhile, in the case where 70% or less of the repeatedly measured spectrum data has passed the repeatability verification, the verifier 530 may determine to remeasure the spectrum data.

In yet another example, the verifier 530 may determine whether to remeasure the spectrum data based on the number of times that each spectrum data has failed to pass the repeatability verification. The verifier 530 may, for example, verify repeatability of the spectrum data based on similarity, difference, and statistical verifications. In the case where among the repeatedly measured spectrum data, there are two or more spectrum data, of which the number of times that the spectrum data has failed to pass the repeatability verification is less than twice, the verifier 530 may determine to analyze the spectrum data. Meanwhile, in the case where the number of the spectrum data thereof is less than two, the remeasurement determiner 131 may determine to remeasure the spectrum data.

The number of spectrum data, a rate thereof, and the number of times being described is just an example, and is not limiting.

The verifier 530 may control the calculator 550 to analyze at least one of the plurality of the measured spectrum data based on at least one of the following: the number of spectrum data having passed the repeatability verification, a rate thereof, and the number of times that each spectrum data has failed to pass the repeatability verification.

For example, the verifier 530 may control the analysis apparatus to analyze at least one of the plurality of the measured spectrum data based on the number of the spectrum data having passed the repeatability verification. For example, in the case where the number of the spectrum data having passed the repeatability verification is two, the verifier 530 may control the analysis apparatus to analyze only the two spectrum data, or to analyze one of the two spectrum data according to a predetermined rule. Alternatively, the verifier 530 may control the analysis apparatus to analyze all the spectrum data that has failed to pass the verification, as well as the two spectrum data having passed the verification.

In another example, the verifier 530 may control the analysis apparatus to analyze at least one of the plurality of the measured spectrum data based on the rate of the spectrum data having passed the repeatability verification. For example, in the case where the rate of the spectrum data having passed the repeatability verification is greater than or equal to 70%, the verifier 530 may control the analysis apparatus to analyze the entire of the spectrum data, or to analyze only the spectrum data having passed the verification. Alternatively, the verifier 530 may control the analysis apparatus to analyze only one of the spectrum data having passed the verification, according to a predetermined rule.

In yet another example, the verifier 530 may control the analysis apparatus to analyze at least one of the plurality of the measured spectrum data based on the number of times that each spectrum data has failed to pass the verification. For example, the verifier 530 may control the analysis apparatus to analyze only the spectrum data, of which the number of times that each spectrum data has failed to pass the verification is zero. In another example, the verifier 530 may control the analysis apparatus to analyze only the spectrum data, of which the number of times that each spectrum data has failed to pass the verification is less than or equal to one.

The number of spectrum data, a rate thereof, and the number of times being described is just an example, and is not limiting.

In response to a request for analyzing two or more spectrum data, the verifier 530 may send a request to the calculator 550 so that the analysis apparatus analyzes each spectrum data. Alternatively, in response to a request for analyzing two or more spectrum data, the verifier 530 may send a request to the calculator 550 so that the analysis apparatus analyzes the spectrum data that is generated using at least one of the values of mean, median, max, and min of each spectrum data.

The calculator 550 may generate user sample analysis information by analyzing, based on the verification result, at least a part of the spectrum data that is acquired from the spectroscopy unit.

For example, in the case where the verifier 530 makes a request for analyzing two or more spectrum data, the calculator 550 may generate the user sample information by analyzing the spectrum data by using the spectrum data, which is calculated using at least one of the values of mean, median, max, and min of each spectrum data.

In another example, in the case where the verifier 530 makes a request for analyzing the two or more spectrum data, the calculator 550 may generate the user sample analysis information by using a result value, which is calculated using at least one of the values of mean, median, max, and min.

The user sample information may be, for example, a user's blood pressure, body fat percentage, blood sugar, cholesterol concentrations, triglyceride percentage, the number of blood cells, enzyme concentration, hormone concentration, and glomerular filtration rate.

The information provider 570 may provide a user with the generated user sample analysis information.

The information provider 570 is electrically connected to the calculator 550, so that the information provider 570 may receive the user sample analysis information from the calculator 550 to provide a user with the generated user sample analysis information by using at least one of visual, auditory, and tactile ways.

The information provider 570 may include, for example, a display to provide the user sample analysis information to a user as the visual way. In the case where the information provider 570 provides a user's blood sugar information to the user, the information provider 570 may display characters and numbers together, e.g., "blood sugar: 120 mg/dl".

The information provider 570 may include, for example, a speaker to provide the user sample analysis information to a user as the auditory way. In the case where the information provider 570 provides a user's blood sugar information to the user, the information provider 570 may generate an audio signal, which is then output through the speaker, e.g., "Your blood sugar is 120 mg/dl."

The information provider 570 may include, for example, a vibrating device to provide the user sample analysis information to a user as the tactile way. In the case where the information provider 570 provides a user's blood sugar information to the user, and the provided blood sugar exceeds a value of a set blood sugar, the information provider 570 may operate the vibrating device so that a user recognizes the value of the blood sugar is exceeded.

Figure 7:
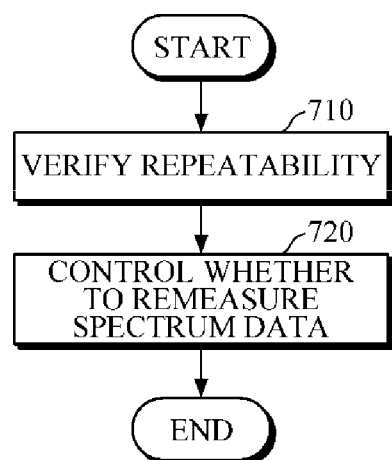
FIG. 7 is a flowchart illustrating a method of verifying repeatability according to an exemplary embodiment.

FIG. 7 is a flowchart illustrating a method of verifying repeatability according to an exemplary embodiment.

Referring to FIG. 7, an apparatus for verifying repeatability (hereinafter, referred to as 'verification apparatus') may verify the repeatability based on predefined repeatability verification criteria in operation 710.

Here, the predefined repeatability verification criteria may include a similarity verification, a difference verification, a statistical verification, or a combination of two or more of the verification criteria.

The verification apparatus first receives spectrum data from a spectroscope so as to verify the repeatability of the spectrum data, and obtains an operation value of the received spectrum data based on the repeatability verification criteria. For example, the operation value may be a degree of similarity, a degree of difference, and statistical data depending on the repeatability verification criteria. Afterwards, the verification apparatus may compare the operation value and a threshold, thereby verifying the repeatability of the spectrum data.

When the repeatability is verified, the verification apparatus controls whether the spectroscope will remeasure the spectrum data based on the verification result in operation 720. Here, the verification apparatus may determine whether to analyze the spectrum data based on the verification result, or whether to request the spectroscope to remeasure new spectrum data. Upon determining based on the result that a remeasurement thereof is needed, the verification apparatus requests the spectroscope to remeasure the spectrum data. Otherwise, the verification apparatus may control to analyze the spectrum data.

Figure 8:
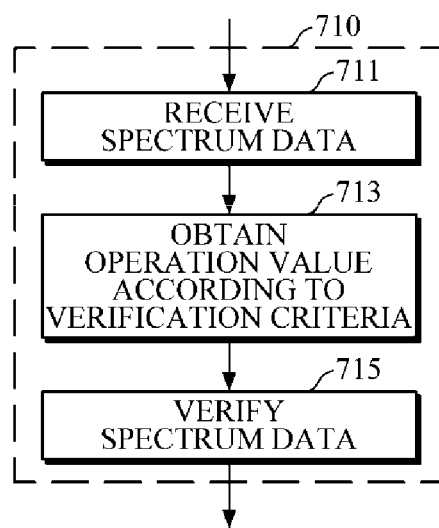
FIG. 8 is a detailed flowchart illustrating a method of verifying repeatability according to an exemplary embodiment.

FIG. 8 is a detailed flowchart illustrating a method of verifying repeatability (hereinafter, referred to as 'verification apparatus') according to an exemplary embodiment.

Referring to FIG. 8, the verification apparatus receives spectrum data from a spectroscope so as to verify the repeatability of the spectrum data in operation 711.

Afterwards, the verification apparatus may obtain a necessary operation value based on repeatability verification criteria in operation 713 so as to verify the repeatability of the spectrum data that is measured by the spectroscope based on the predefined repeatability verification criteria.

In the case where the verification apparatus, for example, uses a similarity as the predefined verification criterion, the verification apparatus may calculate degrees of similarity between a plurality of spectrum data that is measured by the spectroscope, and verify the repeatability based on the calculated degrees of similarity. In other words, the operation value may be the degree of similarity.

In another example, in the case where the verification apparatus uses a difference as the predefined verification criterion, the verification apparatus may calculate degrees of difference between a plurality of spectrum data that is measured by the spectroscope, and verify the repeatability based on the calculated degrees of difference. In other words, the operation value may be the degree of difference.

In yet another example, in the case where the verification apparatus uses statistical verification as the predefined verification criterion, the verification apparatus may calculate statistical data between the plurality of spectrum data that is measured by the spectroscope, and verify the repeatability based on the calculated statistical data. In other words, the operation value may be the statistical data.

Afterwards, the verification apparatus may compare the operation value and a threshold, thereby verifying the repeatability of the spectrum data measured by the spectroscope based on the repeatability verification criteria in operation 715.

Figure 9:
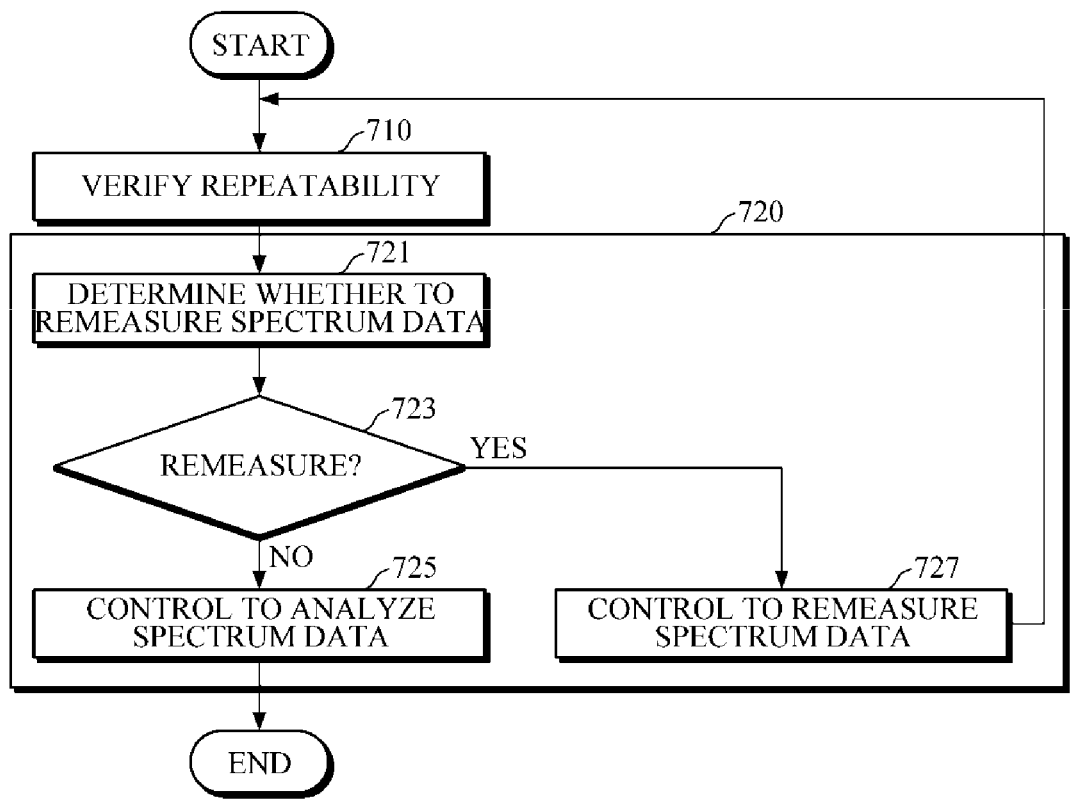
FIG. 9 is a detailed flowchart illustrating an operation of controlling whether to remeasure spectrum data according to an exemplary embodiment.

FIG. 9 is a detailed flowchart illustrating an operation of controlling whether to remeasure spectrum data according to an exemplary embodiment.

Referring to FIG. 9, in response to the verification result, the verification apparatus determines, as illustrated in operation 721, whether to remeasure spectrum data, or to analyze the measured spectrum data, based on at least one of the following: the number of spectrum data having passed the repeatability verification, a rate thereof, and the number of times that each spectrum data has failed to pass the verification.

The verification apparatus may determine whether to remeasure the spectrum data based on, for example, the number of spectrum data having passed the repeatability verification. In the case where there are in total three spectrum data being repeatedly measured, and the two or more spectrum data have passed the repeatability verification, the verification apparatus may determine to analyze the spectrum data. Meanwhile, in the case where the number of the spectrum data having passed the repeatability verification is less than two, the verification apparatus may determine to remeasure the spectrum data.

In another example, the verification apparatus may determine whether to remeasure the spectrum data based on the rate of the spectrum data having passed the repeatability verification. In the case where 70% or more of the repeatedly measured spectrum data has passed the repeatability verification, the verification apparatus may determine to analyze the spectrum data. Meanwhile, in the case where 70% or less of the repeatedly measured spectrum data has passed the repeatability verification, the verification apparatus may determine to remeasure the spectrum data.

In yet another example, the verification apparatus may determine whether to remeasure the spectrum data based on the number of times that each spectrum data does not pass the repeatability verification. For example, in the case where among the repeatedly measured spectrum data, there are two or more spectrum data, of which the number of times that the spectrum data failed to pass the verification is less than twice, the verification apparatus may determine to analyze the spectrum data. Meanwhile, in the case where the number of the spectrum data having passed the repeatability verification is less than two, the verification apparatus may determine to remeasure the spectrum data.

Afterwards, in the case where the verification apparatus has determined that the spectrum data is to be analyzed (NO in operation 723), the verification apparatus requests an apparatus for analyzing spectrum data (hereinafter, referred to as 'analysis apparatus') to analyze the spectrum in operation 725. For example, in the case where the spectrum data has been analyzed, the verification apparatus may depending on the result, determine which spectrum information of a plurality of the measured spectrum data to be analyzed, on the basis of at least one of the following: the number of spectrum data having passed the repeatability verification, a rate thereof, and the number of times that each spectrum data has failed to pass the verification. Then, the verification apparatus requests the analysis apparatus to analyze at least one spectrum data that is determined to be analyzed.

Meanwhile, in the case where the verification apparatus has determined that the spectrum data is to be remeasured (YES in operation 723), the verification apparatus requests a spectroscope to remeasure the spectrum data in operation 727. For example, in the case where analyzing the spectrum data has been performed, the verification apparatus may depending on the result, determine whether to request the spectroscope to remeasure the spectrum data on the basis of at least one of the following: the number of spectrum data having passed the repeatability verification, a rate thereof, and the number of times that each spectrum data has failed to pass the verification. Then, the verification apparatus determines how many spectrum data the verification apparatus requests to the spectroscope, and depending on the determined number thereof, requests the spectroscope to remeasure the spectrum data.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks, and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa In addition, a computer-readable storage medium may be distributed among computer systems connected through a network and computer-readable codes or program instructions may be stored and executed in a decentralized manner.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art

What is claimed is:

1. A method of verifying repeatability of a spectroscope, the method comprising:

performing a repeatability verification of a set of spectrum data of a user sample using at least two sets of spectrum data of the user sample, among a plurality of spectrum data measured by the spectroscope at different points in time, by irradiating light to the user sample and detecting the light reflected from the user sample, based on a repeatability verification criteria; and controlling the spectroscope whether or not to remeasure the set of spectrum data, based on verification result of the repeatability verification, wherein the set of spectrum data and the at least two other sets of spectrum data that are measured by the spectroscope are arranged into at least three different pairs comprising a different combination of sets of spectrum data, respectively, among the set of spectrum data and the at least two other sets of spectrum data, and the performing the repeatability verification further comprises comparing the at least three different pairs to each other and applying the repeatability verification criteria to a result of the comparing, respectively.

2. The method of claim 1, wherein the repeatability verification criteria comprise at least one from among a similarity verification, a difference verification, and a statistical verification.

3. The method of claim 2, wherein the at least two other sets of spectrum data are measured by the spectroscope prior to measuring the set of spectrum data, and the performing the repeatability verification further comprises:
 performing the repeatability verification of the set of spectrum data based on the repeatability verification criteria by using at least one from among mean values and median values of the at least two other sets of spectrum data.

4. The method of claim 2, wherein the repeatability verification criteria comprises the similarity verification, and the method further comprises:
 calculating a degree of similarity between the set of spectrum data and the at least two other sets of spectrum data, respectively, by using at least one from among a Pearson correlation, a Kendall correlation, and a Spearman correlation; and
 performing the repeatability verification of the set of spectrum data based on the degree of similarity.

5. The method of claim 2, wherein the repeatability verification criteria comprises the difference verification, and the method further comprises:
 calculating a degree of difference between the set of spectrum data and the at least two other sets of spectrum data, by using at least one from among an Euclidean distance, a Manhattan distance, and a Hamming distance; and
 performing the repeatability verification of the set of spectrum data based on the degree of difference.

6. The method of claim 2, wherein the repeatability verification criteria comprises the statistical verification, and the method further comprises:
 calculating statistical data of the set of spectrum data and the at least two other sets of spectrum data, by using at least one from among a paired T-test and a paired Z-test, and
 performing the repeatability verification of the set of spectrum data based on the statistical data.

7. The method of claim 1, wherein the controlling the spectroscope further comprises:

performing the repeatability verification of the set of spectrum data and the at least two other sets of spectrum data based on the repeatability verification criteria, based on the set of spectrum data and the at least two other sets of spectrum data having failed to pass the repeatability verification, controlling the spectroscope to remeasure the set of spectrum data and the at least two other sets of spectrum data; and based on the set of spectrum data and the at least two other sets of spectrum data having passed the repeatability verification, controlling an analysis apparatus to analyze the set of spectrum data and the at least two other sets of spectrum data.

8. The method of claim 7, wherein the controlling the spectroscope further comprises:

based on at least one from among a number of the set of spectrum data and the at least two other sets of spectrum data having passed the repeatability verification, a rate thereof, and a number of times that the set of spectrum data and each of the at least two other sets of spectrum data have failed to pass the repeatability verification, controlling the spectroscope by determining a number of remeasurement times to remeasure the set of spectrum data and the at least two other sets of spectrum data, or controlling the analysis apparatus by determining which of the set of spectrum data and the at least two other sets of spectrum data is to be analyzed.

9. The method of claim 1, wherein the performing the repeatability verification further comprises:

applying the repeatability verification criteria to each of the at least three different pairs, and determining whether the set of spectrum data and each of the at least two other sets of spectrum data passed the repeatability verification based on the verification result generated for each of the at least three different pairs, respectively.

10. A non-transitory computer-readable storage medium storing at least one instruction which, when executed by a processor, causes the processor to perform the method of claim 1.

* * * * *